United States Patent
Kangru et al.

(10) Patent No.: US 7,894,446 B2
(45) Date of Patent: Feb. 22, 2011

(54) METHOD AND SYSTEMS FOR OPTIMIZATION ANALYSIS IN NETWORKS

(75) Inventors: Per Kangru, Fredriksberg (DK); Juergen Voss, Wiesbaden (DE)

(73) Assignee: JDS Uniphase Corporation, Milpitas, CA (US)

( * ) Notice: Subject to any disclaimer, the term of this patent is extended or adjusted under 35 U.S.C. 154(b) by 1182 days.

(21) Appl. No.: 11/286,447

(22) Filed: Nov. 23, 2005

(65) Prior Publication Data
US 2007/0116009 A1 May 24, 2007

(51) Int. Cl.
*H04L 12/56* (2006.01)
*G06F 15/173* (2006.01)

(52) U.S. Cl. .................................. 370/395.21; 709/224

(58) Field of Classification Search ................ 370/236, 370/229, 351, 232, 235, 345, 346, 395.42, 370/458, 395.21, 477; 709/223, 224, 206, 709/226
See application file for complete search history.

(56) References Cited

U.S. PATENT DOCUMENTS

| | | | |
|---|---|---|---|
| 5,819,028 A * | 10/1998 | Manghirmalani et al. ..... 714/57 |
| 5,991,268 A * | 11/1999 | Awdeh et al. ............ 370/236.1 |
| 6,330,428 B1 | 12/2001 | Lewis et al. |
| 6,487,414 B1 | 11/2002 | Tanay et al. |
| 6,832,074 B2 | 12/2004 | Borras-Chia et al. |
| 2002/0075844 A1* | 6/2002 | Hagen ......................... 370/351 |
| 2002/0138443 A1* | 9/2002 | Schran et al. ................. 705/64 |
| 2002/0165934 A1 | 11/2002 | Conrad et al. |
| 2003/0099014 A1* | 5/2003 | Egner et al. .................. 359/124 |
| 2004/0064760 A1* | 4/2004 | Hicks et al. .................... 714/43 |
| 2004/0073640 A1* | 4/2004 | Martin et al. ................ 709/223 |
| 2004/0203435 A1 | 10/2004 | Karlquist et al. |
| 2005/0059397 A1 | 3/2005 | Zhao |
| 2005/0068982 A1 | 3/2005 | Guo et al. |
| 2005/0083874 A1 | 4/2005 | Guo et al. |
| 2006/0015515 A1* | 1/2006 | Collazo ....................... 707/100 |
| 2006/0031024 A1* | 2/2006 | Mountassir ................... 702/19 |
| 2006/0050634 A1* | 3/2006 | Gous ........................... 370/229 |

FOREIGN PATENT DOCUMENTS

GB 2402018 A 11/2004

OTHER PUBLICATIONS

A. Clark, "Tech Note: Voice Quality Measurement," pp. 1-8. Feb. 28, 2005. Retrieved from www.tmcnet.com on Aug. 11, 2005.

(Continued)

*Primary Examiner*—Pankaj Kumar
*Assistant Examiner*—Saba Tsegaye
(74) *Attorney, Agent, or Firm*—Matthew A. Pequignot; Pequignot + Myers LLC (57) ABSTRACT

A user operable component is displayed on a display device and receives user input to assign weight factors for optimization criteria for a communications event from a structured collection of data. Another user operable component is displayed on the display device and receives user input to assign weight factors for optimization criteria for the communication event from another structured collection of data. A network utilization/quality score is obtained from said network utilization/quality criteria and the assigned weight factors, and is displayed on the display device. An optimization score is obtained from said optimization criteria and the assigned weight factors and is also displayed on the display device.

13 Claims, 9 Drawing Sheets

OTHER PUBLICATIONS

ETSI TS 101 329-5 V1.1.1 (Nov. 2000) Technical Specification. "TIPHON Release 3; Technology Compliance Specification; Part 5: Quality of Service (QoS) measurement methodologies," pp. 1-35. (c) European Telecommunications Standards Institute 2000.

H. Schulzrinne et al. "RTP: A Transport Protocol for Real-time applications," pp. 1-98. (c) The Internet Society 2003. Retrieved from www.ietf.org on Aug. 11, 2005.

A. Clark et al. Internet Draft: "TRCP Extensions for Voice over IP Metric Reporting." Jul., 2002. Available at www.mp.br/ietf/internet-drafts/draft-clark-avt-rtcpvoip-01.txt.

S. Jackowski. "RFC 1946—Native ATM Support for ST2+" May 1996. Retreived from www.faqs.org/rfcs/rfc1946.html on Jun. 21, 2005, pp. 1-17.

S. Garg et al. "A New Admission Control Metric for VoIP Traffic in 802.11 Networks." IEEE Wireless Communications and Networking Conference WCNC 2003, pp. 1-16.

M. Siller. "Improving Quality of Experience for Multimedia Services by QOS Arbitration on a QOE Framework." IEEE PV 2003 Proc., 13th Packet Video Workshop, Nantes, France, Apr. 2003.

A. Johnsson. Malardalen University Licentiate Thesis: "Bandwidth Measurements in Wired and Wireless Networks." Apr. 2005, pp. 1-104.

"Reducing Churn in GSM Networks: Synchronizing Base Stations Improves Call Hand-Off Performance." (c) 2005 Symmetricom, Inc., pp. 1-2.

S. Garg et al. "Wireless Access Server for Quality of Service and Location Based Access Control in 802.11 Networks." Proc. of the 7th Intl. Symp. On Comp. and Comm. 2002.

C. F. Chiasserini et al. "Energy Efficiency of Radio Link Protocols in 3GPP Systems," IEEE Vehicular Technology Conference (VTC) Rhode Island, Greece, May 6-9, 2001.

A. Gurtov et al. "Multi-Layer Protocol Tracing in a CPRS Network," Proc. of IEEE Vehicular Technology Conference (VTC), Sep. 2002.

D. Wu, "QoS Provisioning in Wireless Networks," Available at citeseer.ist.psu.edu/718128.html.

S. I. Maniatis et al. "QoS issues in the converged 3G wireless and wired networks," IEEE Comm. Magazine 40(8) Aug. 2002, pp. 44-53.

S. Kwon et al. "Power controlled H-ARQ in cdma2000 1xEV-DV," IEEE Comm. Magazine 43(4), Apr. 2005, pp. 77-81.

Y. Kim et al. "Upper layer enhancements for fast call setup in cdma2000 revision D," IEEE Comm. Magazine 43(4), Apr. 2005, pp. 57-64.

"Basic concepts of WCDMA Radio Access Networks" (White Paper) available at www.cdg.org/resources/white_papers.asp. (c) Ericsson Radio Systems AB 2001.

"Universal Mobile Telecommunications System (UMTS) Protocols and Protocol Testing," available at http://www.iec.org/online/tutorials/umts/topic01.html?Back.x=12&Back.y=18. (c) 2001 International Engineering Consortium.

* cited by examiner

ATM  asynchronous transfer mode

METHOD AND SYSTEMS FOR OPTIMIZATION ANALYSIS IN NETWORKS

BACKGROUND OF THE INVENTION

As the use of networks increases, especially in telecommunications, network system providers face conflicting demands from the customer, who demands increase network reliability and performance, and from the business environment, which is sensitive to the cost of operating and maintaining the higher level of service.

Telecommunications networks provide one illustrative example. In telecommunications networks today two basic paradigms are present, either capacity is over provisioned to ensure quality or quality is guaranteed by means of traffic contracts. Traffic Contracts are the traditional mean of a telecom operator and telecom network equipment manufacturer (NEM). The over provisioning is the approach that IP-carriers in many cases have chosen to adopt.

In Wired networks the amount of capacity is simply the quantity of the optical cables and the capacity of each of them. With the possibility to, today, transmit 40 Gbps in a single fiber, sufficient capacity, in the network core, can be, today, obtained given a proper design. In Wireless networks, capacity is determined by how a finite amount of spectrum is modulated to achieve a high throughput. The capacity and the performance can in many cases be measured in $Mbps/km^2$.

In wireless networks, the reduction of user turnover (also referred to as churn) is a key business driver. In a competitive marketplace, network operators strive to improve network coverage and hand off performance in order to reduce dropped call rates, an inverse measure of quality of service which is a key contributor to churn. The network operators face trade-offs between investment, churn and quality of service.

Since capacity in wireless networks is dependent on both the amount of network equipment, i.e. Base Stations, and the optimization of the radio coverage (antenna tuning, frequency planning, power tuning etc.), quality and performance become a factor of investment with a much higher level of investment needed for a certain end user capacity than a Wired core network would have.

A problem arises in balancing a good enough quality against an investment level that the business can support. The concept can be deduced down to two simple parameters: Quality of the connection for the end user and the level of Optimization of the connection for the end user.

Traditionally Quality has been possible to be measured in Voice connections using standardized formulas, PSQM, PESQ, PAMS etc. These are all relevant to Voice calls and voice connections. They are as well based on active traffic generation.

For quality analysis of IP transactions, IETF and ETSI have developed a certain amount of test cases. These are based on active testing but can in most cases easily be adopted into a framework of passive testing. Neither IETF nor ETSI have developed any normalization scheme for the test cases, i.e. it is not understood if a certain measurement result is good or bad.

Therefore, there is a need to provide methods and systems that enable network operators and network equipment manufacturers (NEMS) to understand the level of optimization in both current networks and networks under deployment.

In order to satisfy or balance those demand on network operators and NEMs, network analysis systems have been developed to facilitate the planning, troubleshooting, installing, and maintaining present-day networks.

Many network analysis systems have a graphical user interface that displays data in the network grouped by data session or by independent network events. A number of these groups can be displayed along with characteristics of the data. The display enables the identification of errors. However, present network analysis systems do not display data that enables network operators and NEMs to understand the level of optimization in both current networks and networks under deployment.

Therefore, there is a need for improved graphical user interfaces that display data that enables network operators and NEMs to understand the level of optimization in both current networks and networks under deployment.

BRIEF SUMMARY OF THE INVENTION

In one instance, an embodiment of the graphical user interface of this invention includes a component capable assigning weight factors to network utilization/quality scoring criteria, for a communications event, from a structured collection of data; another component capable of assigning weight factors for optimization criteria, for the communications event, from another structured collection of data, a network utilization/quality score, for the communication event, displayed on the display device; where the network utilization/quality score is obtained from the network utilization/quality criteria and the weight factors assigned using the component, and, an optimization score, for the communication event, displayed on the display device, where the optimization score is obtained from the optimization criteria and the weight factors assigned using the other component.

In another embodiment of the graphical interface of this invention, the network utilization/quality scoring criteria includes network utilization scoring criteria and quality scoring criteria; and, the network utilization/quality includes a network utilization score and a quality score.

Other embodiment of the graphical interface of this invention and methods for displaying network optimization information are also disclosed.

Systems that implement the method of this invention are also within the scope of this invention.

BRIEF DESCRIPTION OF THE SEVERAL VIEWS OF THE DRAWING

For a better understanding of the present invention, together with other and further needs thereof, reference is made to the accompanying drawings and detailed description and its scope will be pointed out in the appended claims.

DETAILED DESCRIPTION OF THE INVENTION

Graphical user interfaces, methods and systems that enable providing optimization information for networks are disclosed herein below.

In one instance, an embodiment of the graphical user interface of this invention includes a component capable assigning weight factors to network utilization/quality scoring criteria, for a communications event, from a structured collection of data; another component capable of assigning weight factors for optimization criteria, for the communications event, from another structured collection of data, a network utilization/quality score, for the communication event, displayed on the display device; where the network utilization/quality score is obtained from the network utilization/quality criteria and the weight factors assigned using the component, and, an optimization score, for the communication event, displayed on the display device, where the optimization score is obtained from the optimization criteria and the weight factors assigned using the other component.

In another embodiment of the graphical interface of this invention, the network utilization/quality scoring criteria includes network utilization scoring criteria and quality scoring criteria; and, the network utilization/quality includes a network utilization score and a quality score.

In a further embodiment of the graphical interface of this invention, the graphical interface displays another optimization score. The other optimization score is obtained using some of the optimization criteria and some of the weight factors obtained by using the other component.

In another instance, a computer readable medium has computer readable code embodied therein that causes a computer to implement the graphical user interface of this invention.

A "structured collection of data" as used herein includes, but is not limited to, lists, a structured arrangement containing of data, and other means for providing groupings of data.

"Component" as used herein refers to means for selecting options in graphical user interfaces (GUIs) such as, but not limited to, menus, pull down menus, dialog boxes, drag and drop between dialog boxes, and other selecting and input means (see, for example, C. Petzold, Programming Windows, ISBN 1-57231-995-X, Ch. 9, Ch. 10, Ch. 11, pp. 357-566).

In one embodiment, the communication event includes signaling messages.

Figure 1:
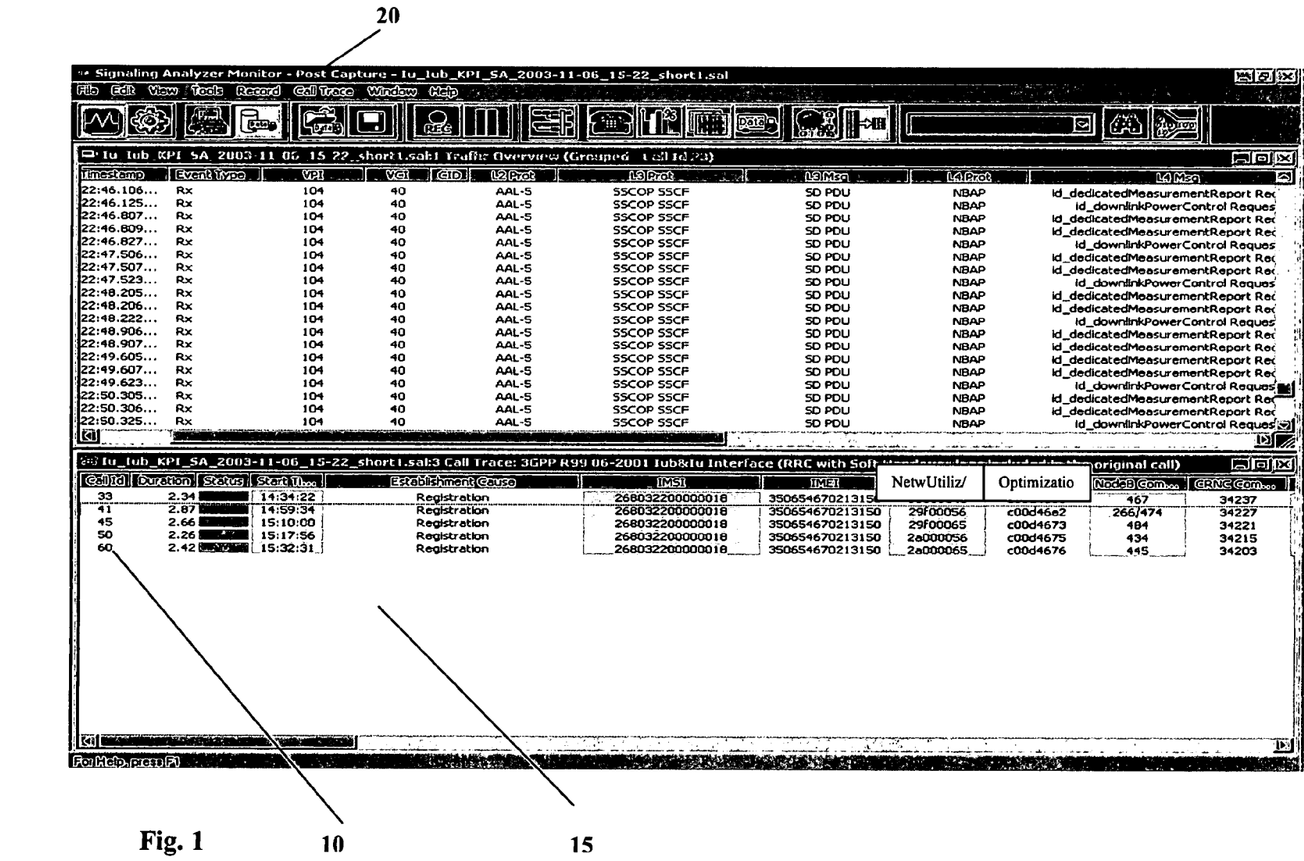
FIG. 1 is a graphical depiction of an embodiment of the user interface of this invention.

In an embodiment of the user interface of this invention, shown in FIG. 1, data 10 for a number of signaling messages (wireless telephone calls in the example shown) is displayed in a Call Trace window 15, each signaling message corresponding to a communication event. A network utilization/quality score and an optimization score are displayed in the call trace window 15. The embodiment of the user interface of this invention shown in FIG. 1 includes a component capable of assigning weight factors to network utilization/quality scoring criteria from a structured collection of data and another component capable of assigning weight factors for optimization criteria from another structured collection of data. The network utilization/quality scoring criteria are using obtaining the network utilization/quality score and the optimization criteria are used in obtaining the optimization score.

The components, in one embodiment, can be accessible by means of a menu such as the call trace menu 20 of FIG. 1. In one embodiment, accessing the call trace menu 20 (such as by "clicking" on the call trace menu name) causes a list to appear.

Figure 2:
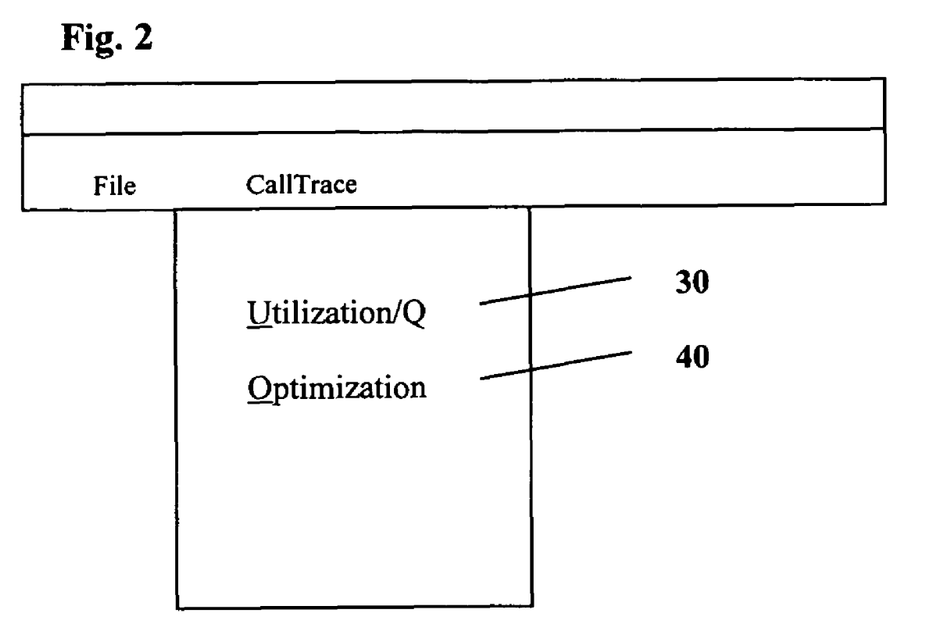
FIG. 2 is a graphical schematic depiction of a component in an embodiment of the user interface of this invention.
Figure 3:
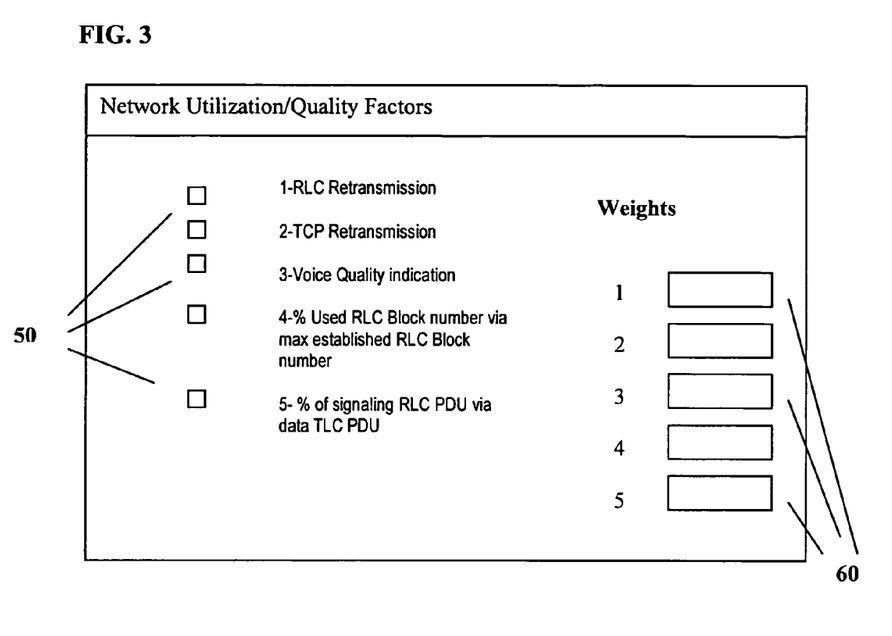
FIG. 3 is a graphical schematic depiction of another component in an embodiment of the user interface of this invention.

An exemplary embodiment is shown in FIG. 2. In the exemplary embodiment shown in FIG. 2, accessing the call trace menu 20 causes a list to appear that includes a menu item 30 for network utilization/quality criteria and another menu item 40 optimization criteria. In the exemplary embodiment, selecting the menu item 30, 40 causes a dialog box, shown in FIG. 3, which allows selection of the criteria, by means of check boxes 50, and of the weight factors by means of a child windows 60. It should be noted that this invention is not limited to the exemplary embodiment shown in FIGS. 2 and 3 and at a number of other embodiments are within the scope of this invention. It should also be noted that the embodiment of the components will be different for different operating systems and that all of those embodiments are within the scope of this invention.

It should be noted that the embodiment shown in FIG. 1 includes embodiments in which the network utilization/quality score comprises a network utilization score and a quality score.

Figure 4:
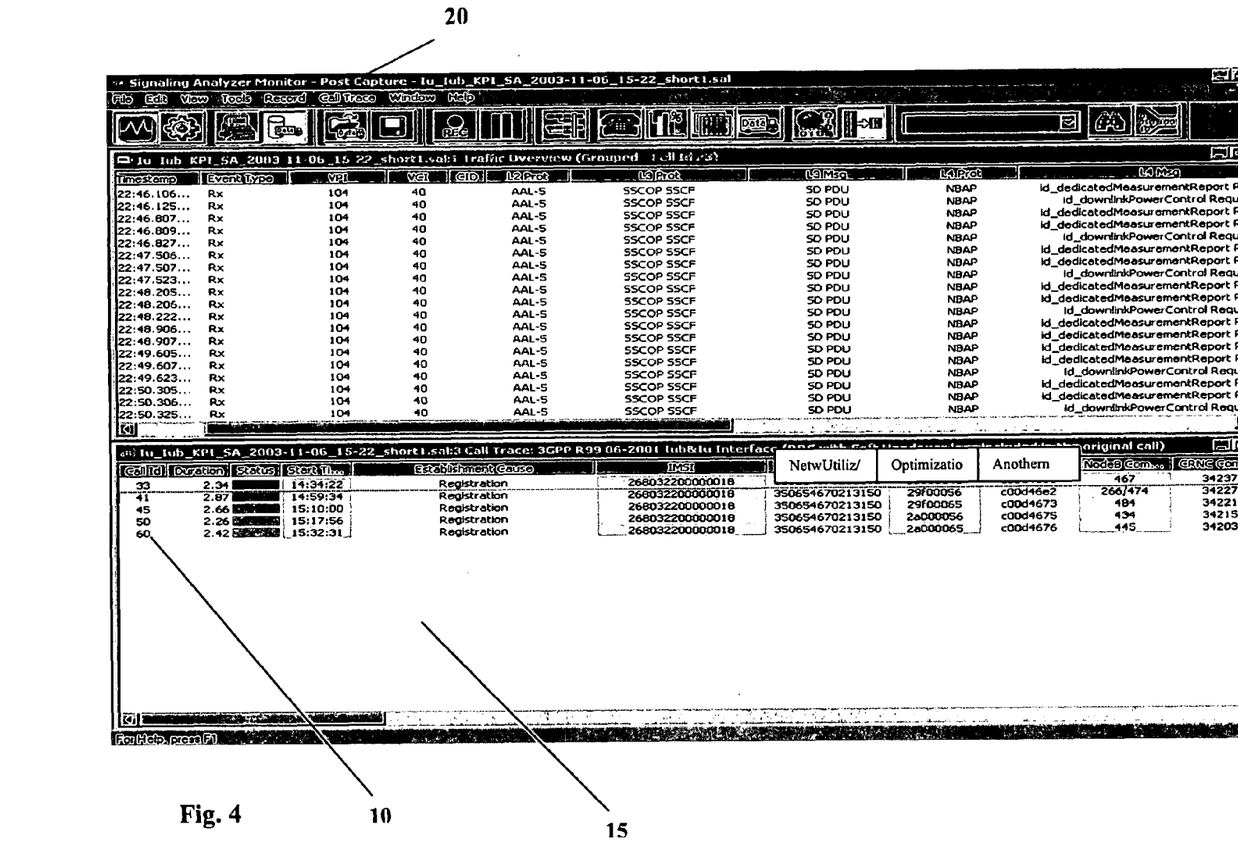
FIG. 4 is a graphical depiction of another embodiment of the user interface of this invention.

In another exemplary embodiment of the graphical interface of this invention, shown in FIG. 4, another optimization score is also displayed in the call trace window 15. The other optimization score is obtained utilizing the optimization criteria and the weight factors assigned by means of the other component. The other optimization score can include, but it contributed to, % of Time being in 1-way handover, % of Time being in 2-way handover, % of Time being in 3-way handover and Maximum Number of Channel Switching between FACH/RACH and DCH per minute. There are several possible embodiments of methods that would enable the graphical user interface to display the other optimization score. In one instance, the other optimization score is even a full weight of 100% as a weight factor. The full weight of 100% would, by means of a computer usable code, cause a processor to display the other optimization score. In another instance, a dialog box, such as that shown in FIG. 3, would enable indicating that a criterion, from the optimization criteria, is to be used as the other optimization score. It should be noted that this invention is not limited to only the two embodiments discussed above.

Figure 5:
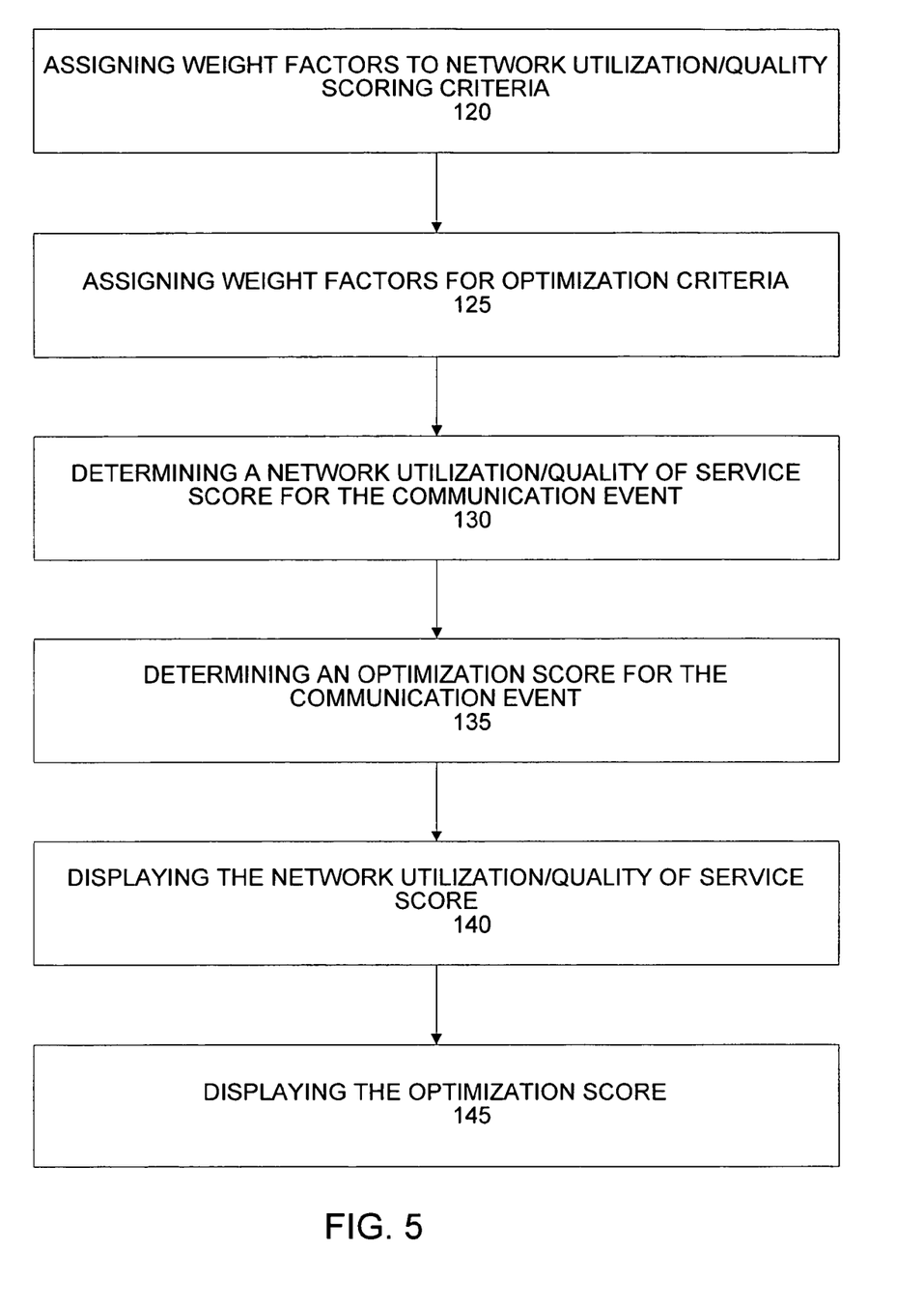
FIG. 5 is a graphical schematic representation of a flowchart of an embodiment of the method of this invention.

A flowchart of an embodiment of the method of this invention is shown in FIG. 5. Referring to FIG. 5, the embodiment 100 of the method of this invention includes the steps of assigning weight factors to network utilization/quality scoring criteria from a structured collection of data (step 120, FIG. 5), assigning weight factors for optimization criteria from another structured collection of data (step 125, FIG. 5), determining, from data corresponding to a communication event, utilizing network utilization/quality scoring criteria and the weight factors assigned by use of the first component, a network utilization/quality of service score for the communication event (step 130, FIG. 5), determining, from data corresponding to the communication event, utilizing the optimization criteria and the weight factors assigned by use of the other component, an optimization score for the communication event (step 135, FIG. 5), displaying the network utilization/quality of service score (step 140, FIG. 5) and displaying the optimization score (step 145, FIG. 5).

Figure 6:
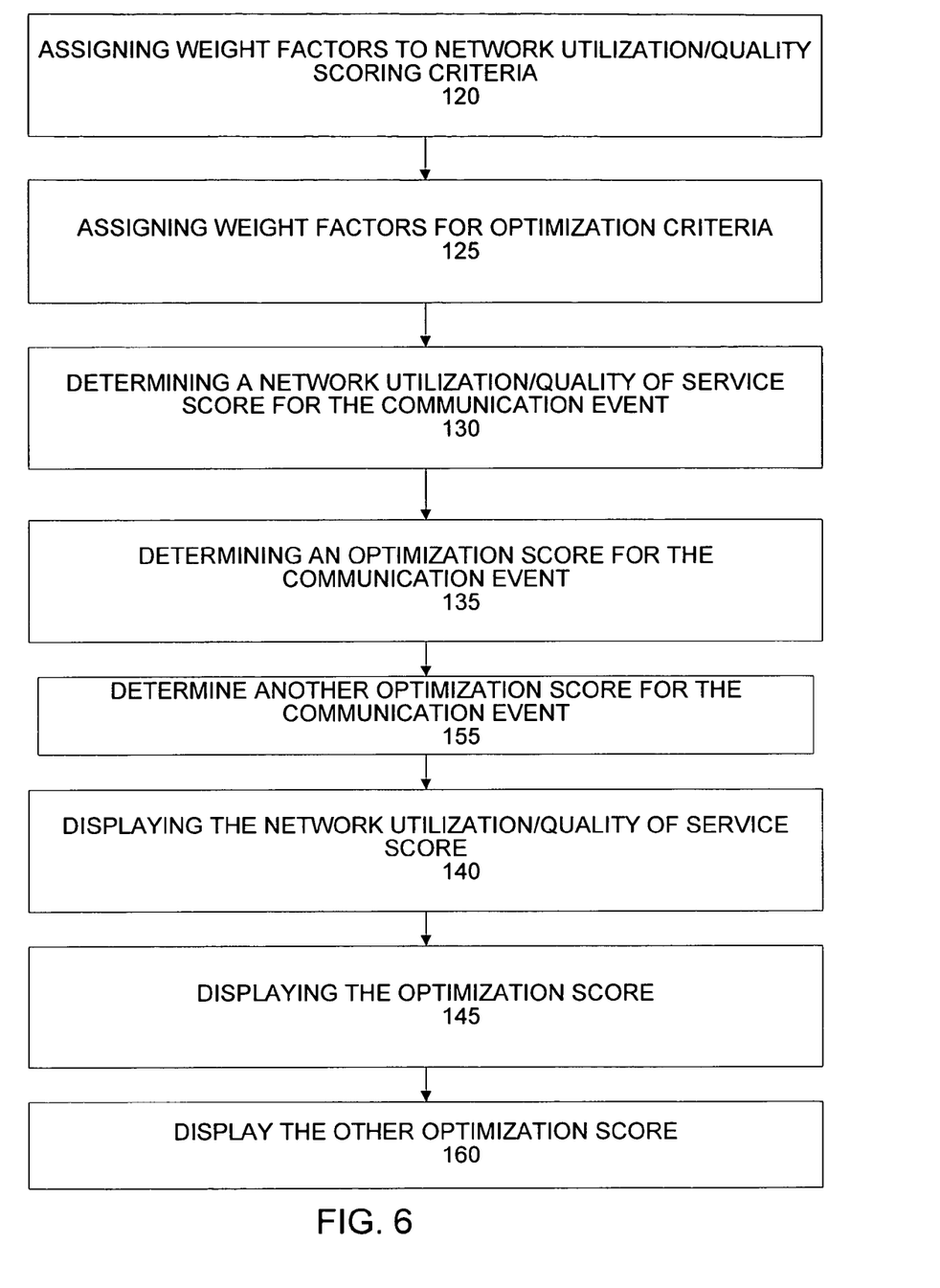
FIG. 6 is a graphical schematic representation of a flowchart of another embodiment of the method of this invention.

Shown in FIG. 6 is a flowchart of another embodiment of the method of this invention. Referring to FIG. 6, the embodiment 150 of the method of this invention includes the additional steps of determining, from data corresponding to the communication event, utilizing the optimization criteria and the weight factors assigned by use of another component, another optimization score for the communication event (step 155, FIG. 6) and displaying the other optimization score (step 160, FIG. 6).

Some exemplary embodiments of the some of the steps of an embodiment of the method of this invention are presented here in below. In one instance, for each connection (including, but not limited to, Voice, Video, text and data connections) in a Wireless Network (including but not limited to UMTS, CDMA2k, GSM/GPRS, WiFi, WiMAX, Bluetooth), control plane signaling messages, i.e. messages are used to handle the setup and management of the connection, are used. When the connection is established, control plane messages can be used to manage the quality of the connection and to handle handovers, i.e. re-allocation of network resources to connect the connection to a different set of network resources (including, but not limited, to Base Stations, Core networks etc).

In one instance, in the connection, the End User Data (including but not limited to Voice, Video, Text, Data) can be sent. The End User Data is normally sent between either a single to a single recipient (1:1) or between a single sender to multiple receivers (1:Many) or between Many senders to multiple receivers (Many: Many). All of these type of transactions will have some expectation of the Quality of the connection. If the expectation is known, the expectation can be communicated in the network using Control Plane signaling or the User Plane connection.

From either the Control Plane Signaling information or from predetermined resource allocation for the connection, the resource allocation, the amount of network resources that are reserved for the specific connection, can be determined. In the cases where the network is providing so called 'soft handovers', i.e. for a period of time allowing the End User to have multiple connections to the network, all of these connections need to be considered to be part of the resources used.

It should be noted that the quality of service score and the resource utilization score can be utilized, together with a predetermined optimization criterion, to optimize the network. The network operator can select the level of quality (related to customer satisfaction) and the resource utilization (related to the investment level) that the network operator wants to develop the network against. This selection of the level of quality and the resource utilization constitutes the optimization criterion.

The details of Quality score calculation algorithm may be different for each of the different services (including, but not limited to, Voice, Data, Video, Text). Various methods of calculating a quality of service indicator have been developed (for a discussion of some of these methods for voice quality indications see, for example, Tech Note: Voice Quality Measurement, by Alan Clark available at http://www.tmcnet.com/tmcnet/articles/2005/voice-quality-measurement-voip-alan-clark-telchemy.htm, which is herein incorporated by reference.). Some, but not only limited to these, of the quality of service indicators for voice systems are the MOS (mean opinion score), the ITU developed PESQ score, and the R factor obtained using the ITU developed "E" model. (The "E" model is also applicable to data other than voice.) The R factor (transmission rating factor) can be derived from the MOS (mean opinion score) as described in ITU temporary document XX -E WP2/12, study group 12, May 2002, which is herein incorporated by reference. The quality of service indicators for voice and for data communications networks can be related as described in ETSI TS 329-5 V1.1.1 (2000-11), "TIPHON (Telecommunications and Internet Protocol Harmonization Over Networks) Release 3; Technology Compliance Specification; Part five: Quality of Service (QoS) measurement methodologies", which is herein incorporated by reference.

The R factor, the ITU defined transmission rating factor utilized in some quality of service calculations, is given by $$R = Ro - Is - Id - Ie + A$$

where:

"Ro" is a base factor determined from noise levels, loudness, etc.;

"Is" is the signal impairment occurring simultaneously with speech, including: loudness, quantization (CODEC) distortion and non-optimum sidetone level;

"Id" is the impairment that is delayed with respect to speech (may include echo and conversational difficulty due to delay);

"Ie" is the 'equipment impairment factor' and represents the effects of the communication systems on transmission signals;

"A" is the 'advantage factor' and represents the user's expectation of quality when making a using the equipment.

The equipment impairment factor, "Ie", reflects most of the impact of the communication system on quality of service. "Ie" can be defined, in one embodiment, in terms of the equipment impairment factor due to the packet loss, the equipment impairment factor due to packet delay variation and the equipment impairment factor due to the CODEC. (In one embodiment, the equipment impairment factor can be determined using the methods described in ETSI TS 329-5 V1.1.1 (2000-11), section E.) The resulting equipment impairment factor is the sum of the various contributions. It should be noted that other factors in addition to the above described can contribute and the contributions will be, in one embodiment, added. Since packet delay and packet loss can be determined from the information given by the protocol, the impairment factor can be determined and the R factor can also be determined.

The R factor and the MOS values provide quality of service indicators for voice transmission events (the communication event). The expected quality information can be compared to the quality of service indicators in order to obtain a quality of service score.

The format in many protocols includes enough information to identify the sending and receiving ports and to calculate the link utilization as defined in "Bandwidth Measurements In Wired And Wireless Networks", Licentiate thesis presented by Andreas Johnsson, Mälarden University, Västerås, Sweden, April 2005 (defined as the number of bits transferred during a given time divided by the link capacity, where the link capacity is the bit rate of the link), incorporated by reference herein.

Figure 7:
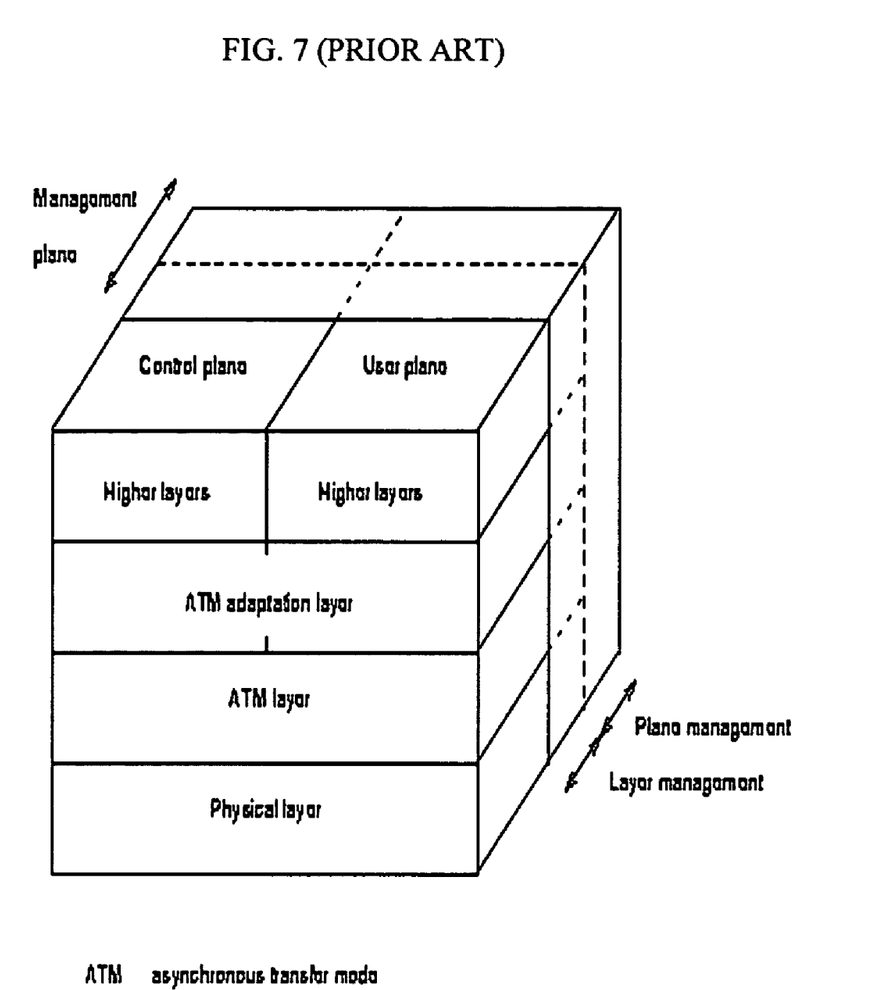
FIG. 7 is schematic representation of a conventional protocol reference model used for ATM.

An example, relating to ATM transmission, is presented below in other to illustrate the method of this invention. (ATM is of interest since ATM is defined for the core transmission of the Universal Mode Telecommunications System, UMTS.) It should be noted that this invention is not limited to this example. The protocol reference model used for ATM is shown in FIG. 7. Referring to FIG. 7, the model can be viewed in terms of three planes, the user plane, the control plane and the management plane, and in terms of at least three layers, the ATM adaptation layer, the ATM layer and the physical layer. In the ATM layer, header information is added to every cell at the transmitter and is removed from every cell at the receiver. The header information includes a Virtual Path Identifier (VPI) and a Virtual circuit Identifier (VCI). As enumerated in RFC 1946, Native ATM Support for ST2+, available at http://www.faqs.org/rfcs/rfc1946.html, which is incorporated by reference herein, quality of service parameters for an ATM network include the number of PDU bytes or desired message size, the PDU rate, the delay and the delay variance (jitter). The loss, delay and jitter and the bandwidth utilization can be determined for each flow, where a flow is determined by the source and destination addresses and ports. From the knowledge of the loss, delay and jitter, an indicator of the quality of service can be obtained. As described in RFC 1946, the desired quality of service can also be included in the data for the protocol.

In one instance, a network utilization indicator is defined as the fraction of time per time unit needed to transmit to flow (see Garg, Kappes, "A New Admission Control Metric For Voip Traffic In 802.11 Networks," Wireless Communications And Networking Conference WCNC 2003, IEEE, which is incorporated by reference herein). Such an indicator could also be used in ATM networks and the protocol provides in of data to calculate the indicator.

Yet another example is presented hereinbelow in order to illustrate some of the details of invention presented above. In networks, such as, but not limited to, wireless networks capable of "soft handovers," the calculation of network utilization has to take into account the fact that there are multiple routes (links or flows). In one instance, the capacity is defined as the smallest bit rate amongst bit rates for each of the multiple links. The utilization of the link is then defined as the number of bits transferred during one communication session (or during a predetermined time) divided by the capacity.

It should be noted that other indicators of utilization are possible, such as, but not limited to, an indication of the number of links or a definition of the equivalent bandwidth for the multiple links. In one instance, the bandwidth for one link is defined as the product of the link capacity and a factor equal to one minus the utilization. For multiple links, the equivalent bandwidth is defined as the smallest bandwidth among the bandwidths for each of the multiple links. In the presence of packet loss, the equivalent bandwidth is a further reduced by a factor equal to one minus the total loss rate.

The above described embodiments are presented as exemplary embodiments of network utilization/quality scoring criteria. It should be noted that the network utilization/quality scoring criteria used will be determined by the system being analyzed. For presently available systems, the network utilization/quality scoring criteria include, but are not limited to, a measure of Radio Link Control (RLC) retransmission, a measure of TCP retransmission, a measure of the percent used RLC block number versus the maximum established RLC block number and the percent of signaling RLC PDU versus data TLC PDU. TCP packet loss can be misinterpreted as congestion losses and lead to throughput degradation. A measure of TCP retransmission can be indicative of throughput or network utilization. (The parameters and description of present networks can be found in "Universal Mobile Telecommunications System (UMTS) Protocols and Protocol Testing", available at http://www.iec.org/online/tutorials/umts/topic01.html?Back.x=12&Back.y=18 and in A. Gurtov et al., "Multi-Layer Protocol Tracing in a GPRS Network," Proceedings of the IEEE Vehicular Technology Conference, Fall 2002, both of which are incorporated by reference herein.)

It should also be noted that optimization criteria will also be determined by the network being analyzed. For present networks, the optimization criteria can include, but is not limited to, a quality of service or quality of experience measure, a reduced slot cycle index (RSCI) (a definition of the RSCI and its relationship to quality or latency is here than in Y. Kim et al., "Upper Layer Enhancements For Fast Call Setup In CDMA 2000 Revision D," IEEE Communications Magazine, April 2005, pp. 60-61, which is incorporated by reference herein), a measure of outer loop power control (power control can determine the size of a cell and represents a trade off in between coverage, interference with other cells, and capacity), the number of soft handovers, the time between soft handovers (in networks with soft handover functionality, a mobile user can communicate with two or more base stations which can result in fewer lost calls), the number of channel switching (in networks with different types of channels that can be used to carry data, the total traffic throughput can be increased) and the time between channel switching. (An exemplary quality of service measure, the data traffic loss probability, is given in Carla-Fabiana Chiasserini, Michela Meo, *Energy Efficiency of Radio Link Protocols in 3 GPP Systems*, IEEE Vehicular Technology Conference (VTC), Rodhe Island, Greece, 6-9 May 2001, which is incorporated by reference herein.)

In order to further illustrate the method of this invention, reference is made to the following exemplary application. The method of this invention can provide a wireless service provider which means by which the wireless service provider can benchmark the entire network and the business model against each other. In one exemplary application, in a UMTS network, the network is developed in many phases. In the first phase the key deliverable is to achieve connection quality for a single or a low number of calls. This is normally not a difficult task and is normally performed by the NEM that is delivering the network equipment. One problem for the Wireless Service Provider is that although a good quality connection can be setup and sustained for a single or a low number of calls the network is not ready for production usage by a high number of subscribers. Utilizing the methods of this invention, the Wireless Service Provide can not only determine the connection Quality but can as well optimize the usage of network resources. Considering the quality of service together with the network utilization enables the Wireless Service Provider to deploy the network into commercial operation at an earlier date and allows the Wireless Service Provider to understand the expected amount of capacity in the Wireless network.

It should be noted that other applications are also within the scope of this invention. It should be also noted that use of this invention can, in some embodiments, depend on the complexity of the system or application. (More complex applications, such as UMTS, may derive more benefit from optimization.)

Figure 8:
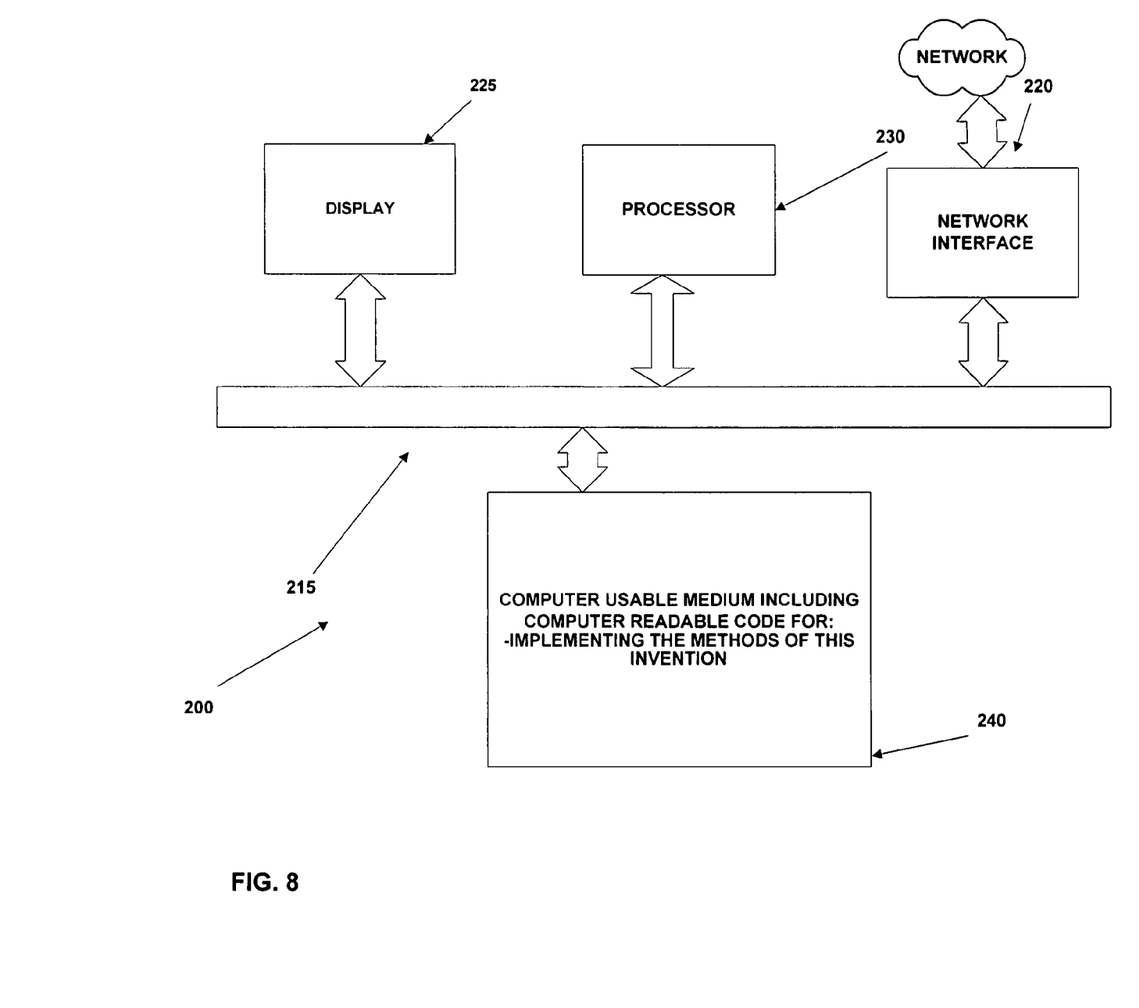
FIG. 8 is a schematic block diagram representation of an embodiment of the system of this invention.

An embodiment of the system of this invention is shown in FIG. 8. Referring to FIG. 8, the embodiment 200 of the system of this invention includes a network interface 220 capable of providing data corresponding to a communication event, a display 225, one or more processors 230, and one or more computer usable media 240 having computer readable code embodied therein. The computer readable code embodied in the one or more computer usable media 240 is capable of causing the one or more processors 230 to execute the method of this invention, including receiving data from a network corresponding to the communication event, provide a user interface for depiction in the display device, the user interface including two or more components as described here in above, where the components allow the assigning weight factors to network utilization/quality scoring criteria and to optimization criteria, determining from the data and the weight factors a network utilization/quality score, determining, from the received data and the weight factors, an optimization score, and displaying the network utilization/quality score and the optimization score on the display device. The computer readable code is capable of, but is not limited to, causing the one or more processors 230 to execute the steps in the methods shown in FIG. 5.

In one embodiment, the network interface 220 extracts the data from packets communicating information between the source and the receiver. The network interface 220 extracts the data from the packets using conventional methods. Once the network interface 220 receives each packet, each packet is parsed and the required data are extracted therefrom.

In another embodiment of the system of this invention, the computer readable code is capable of, but is not limited to, causing the one or more processors 230 to execute the steps in the methods shown in FIG. 6. In one instance, the computer readable code is capable of causing the one or more processors 230 to execute the additional steps of determining, from data corresponding to the communication event, utilizing the optimization criteria and the weight factors assigned by use of said another component, another optimization score for the communication event (step 155, FIG. 6) and displaying the other optimization score (step 160, FIG. 6).

In one embodiment, the network interface 220 includes an acquisition component and a filtering component. The acquisition component can be similar, but is not limited to, to that found in signaling analyzers such as the "J7326A Signaling Analyzer" of AGILENT TECHNOLOGIES, Inc. The acquisition component and Filtering component receive the data from one or more transmission messages and renders the data in a form that can be provided to the one or more processors 230. The acquisition layer and Filtering layer constitute means for providing the data from one or more transmission messages to the one or more processors 230. (In one embodiment, the acquisition component and Filtering component comprise software that instructs the one or more processors 230 to parse the received messages and provides the data to one or more processors 230 for analysis. The same function can be implemented, in another embodiment, in dedicated hardware or dedicated hardware/software.)

The network interface 220, the one or more processors 230, the display 225 and the computer usable medium 240 are operatively connected by means of a connection component 215 (the connection component may be, for example, a computer bus, or a carrier wave).

Figure 9:
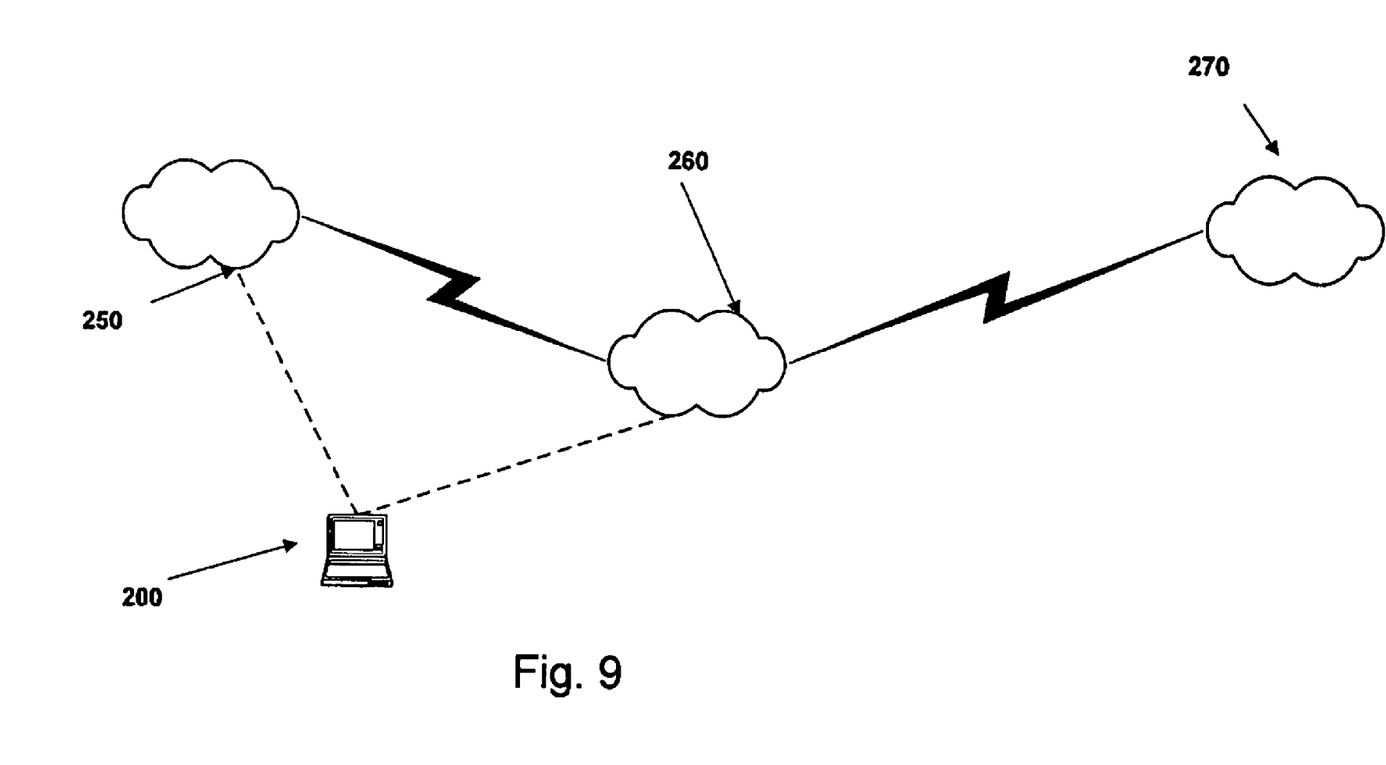
FIG. 9 is a schematic representation of an application of an embodiment of the system of this invention.

An application of the embodiment 200 of the system of this invention is shown in FIG. 9. Referring to FIG. 9, subnetworks 250, 260, and 270 comprise a communication network exchanging or transmitting information in a communication event. The embodiment 200 of the system of this invention is connected such as to be able to capture (observe) the communication event. For example, but it should be noted that this invention is not limited only to this example, the network can be a UMTS network and subnetwork 250 is the radio access network, subnetwork 260 is the ATM network and subnetwork 270 is the core network. The system 100 can be connected in subnetwork 250 or subnetwork 260. In another example, the network is a CDMA2000 network and the subnetwork 260 is mobile switching center (MSC). The system 200 can be, in that example, connected in the subnetwork 260.

In general, the techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to data entered using the input device to perform the functions described and to generate output information. The output information may be applied to one or more output devices.

Elements and components described herein may be further divided into additional components or joined together to form fewer components for performing the same functions.

Each computer program (code) within the scope of the claims below may be implemented in any programming language, such as assembly language, machine language, a high-level procedural programming language, or an object-oriented programming language. The programming language may be a compiled or interpreted programming language.

Each computer program may be implemented in a computer program product tangibly embodied in a computer-readable storage device for execution by a computer processor. Method steps of the invention may be performed by a computer processor executing a program tangibly embodied on a computer-readable medium to perform functions of the invention by operating on input and generating output.

Common forms of computer-readable or usable media include, for example, a floppy disk, a flexible disk, hard disk, magnetic tape, or any other magnetic medium, a CDROM, any other optical medium, punched cards, paper tape, any other physical medium with patterns of holes, a RAM, a PROM, and EPROM, a FLASH-EPROM, any other memory chip or cartridge, or any other medium from which a computer can read.

Although the invention has been described with respect to various embodiments, it should be realized this invention is also capable of a wide variety of further and other embodiments within the spirit and scope of the appended claims.

What is claimed is:

1. At least one computer-readable storage device having a computer readable code embodied therein, wherein the computer readable code is executable by at least one processor, the computer readable code comprising:
    code to cause the processor to display a user interface on a display device, the user interface having,
        a user operable component, displayed on the display device, for receiving input that causes the at least one processor to assign weight factors for optimization criteria, for the communications event, from a structured collection of data;
        another user operable component, displayed on the display device, for receiving user input that causes the at least one processor to assign weight factors for optimization criteria, for the communication event, from another structured collection of data; and
        a network utilization/quality score, for the communication event, displayed on the display device; said network utilization/quality score obtained from said network utilization/quality criteria and the weight factors assigned by use of said component; and
    an optimization score, for the communication event, displayed on the display device, said optimization score obtained from said optimization criteria and the weight factors by use of said another component.

2. The at least one computer-readable storage device of claim 1 wherein said network utilization/quality scoring criteria comprises network utilization scoring criteria and quality scoring criteria; and, wherein said network utilization/quality score comprises a network utilization score and a quality score.

3. The at least one computer-readable storage device of claim 1 further comprising:
    another optimization score, for the communication event, displayed on the display device, said another optimization score obtained from said optimization criteria and the weight factors by use of said another component.

4. A system for providing optimization information for networks, the system comprising:
- a network interface configured to provide data corresponding to a communication event;
- at least one processor;
- a display device;
- at least one computer-readable storage device having computer readable code embodied therein, wherein the computer readable configured to, upon execution by the processor, cause said at least one processor to:
  - receive data, from a network, corresponding to a communication event;
  - provide a user interface for depiction in the display device, the user interface comprising:
    - a user operable component, displayed on the display device, for receiving user input that causes the at least one processor to assign weight factors to network utilization/quality scoring criteria, for the communications event, from a structured collection of data, and
    - another user operable component, displayed on the display device, for receiving user input that causes the at least one processor to assign weight factors for optimization criteria, for the communications event, from another structured collection of data;
  - determine, from the received data, utilizing network utilization/quality scoring criteria and the weight factors assigned by use of said component, a network utilization/quality of service score for the communication event;
  - determine, from the received data, utilizing the optimization criteria and the weight factors assigned by use of said another component, an optimization score for the communication event;
  - display the network utilization/quality of service score on the display device; and
  - display the optimization score on the display device.

5. The system of claim 4 wherein said component causes the at least one processor to assign weight factors to network utilization scoring criteria and to quality scoring criteria; and wherein said computer readable code in causing said at least one processor to determine a network utilization/quality of service score causes said at least one processor to determine a network utilization score and a quality score.

6. The system of claim 4 wherein the computer readable code, in causing said at least one processor to determine the quality of service score, further causes the at least one processor to determine a quality of service indicator for a voice system.

7. The system of claim 4 wherein the computer readable code, in causing said at least one processor to determine the quality of service score, further causes the at least one processor to: determine, from the received data, utilizing the optimization criteria and the weight factors assigned by use of said another component, another optimization score for the communication event; and display said another optimization score.

8. A method for displaying, on a display device in a computer system, network optimization information for a communications event the method comprising the steps of:
- using input received from a graphical user interface,
  - assigning weight factors to network utilization/quality scoring criteria from a structured collection of data using a component displayed on the display device; and
  - assigning weight factors to network utilization/quality scoring Criteria from another structured collection of data using another component displayed on the display device;
- determining, from data corresponding to the communication event, utilizing network the utilization/quality scoring criteria and the weight factors assigned by use of said component, a network utilization/quality of service score for the communication event;
- determining, from data corresponding to the communication event, utilizing the optimization criteria and the weight factors assigned by use of said another component, an optimization score for the communication event;
- displaying, via the graphical user interface, the network utilization/quality of service score; and
- displaying, via the graphical user interface, the optimization score.

9. The method of claim 8 further comprising the steps of:
- determining, from data corresponding to the communication event, utilizing the optimization criteria and the weight factors assigned by use of said another component, another optimization score for the communication event; and
- displaying the another optimization score.

10. An article of manufacture, comprising:
- at least one computer-readable storage device having computer readable code embodied therein, wherein the computer readable code is configured to, upon execution by at least one processor, cause a computer to:
  - receive data, from a network, corresponding to a communication event;
  - provide a user interface for depiction in the display device, the user interface comprising:
    - a user operable component, displayed on the display device, for receiving user input that causes the at least one processor to assign weight factors to network utilization/quality scoring criteria, for a communications event, from a structured collection of data;
    - another user operable component, displayed on the display device, for receiving user input that causes the at least one processor to assign weight factors for optimization criteria, for the communications event, from another structured collection of data;
  - determine, from the received data, utilizing network utilization/quality scoring criteria and the weight factors assigned by use of said component, a network utilization /quality of service score for the communication event, determine, from the received data, utilizing the optimization criteria and the weight factors assigned by use of said another component, an optimization score for the communication event, display the network utilization/quality of service score, and display the optimization score.

11. The article of manufacture of claim 10 wherein said component causes the at least one processor to assign weight factors to network utilization scoring criteria and to quality scoring criteria; and wherein said computer readable code in causing said at least one processor to determine a network utilization/quality of service score causes said at least one processor to determine a network utilization score and a quality score.

12. The article of manufacture of claim 10 wherein the computer readable code, in causing said at least one processor to determine the quality of service score, further causes the at least one processor to determine a quality of service indicator for a voice system.

13. The article of manufacture of claim 10 wherein the computer readable code, in causing said at least one processor to determine the quality of service score, further causes the at least one processor to:

determine, from the received data, utilizing the optimization criteria and the weight factors assigned by use of said another component, another optimization score for the communication event, and display said another optimization score.

* * * * *